(12) United States Patent
Parenta et al.

(10) Patent No.: US 12,084,004 B2
(45) Date of Patent: Sep. 10, 2024

(54) WINDSHIELD WIPER AND A WIPER DEVICE

(71) Applicant: Robert Bosch GmbH, Stuttgart (DE)

(72) Inventors: Denis Parenta, Buehl (DE); Adam Ugron, Budapest (HU); Andrija Terentic, Belgrad (RS); Harald Rapp, Buehl (DE); Matea Mikulic, Novi Beograd (RS); Najdan Jocic, Pancevo (RS); Nikola Dilparic, Cacak (RS); Raf Greunlinx, Zolder (BE); Sascha Geissler, Lichtenau (DE); Stijn Truyens, Tienen (BE); Tanja Bosnic, Belgrad (RS)

(73) Assignee: Robert Bosch GmbH, Stuttgart (DE)

( * ) Notice: Subject to any disclaimer, the term of this patent is extended or adjusted under 35 U.S.C. 154(b) by 260 days.

(21) Appl. No.: 17/558,746

(22) Filed: Dec. 22, 2021

(65) Prior Publication Data
US 2022/0194322 A1 Jun. 23, 2022

(30) Foreign Application Priority Data
Dec. 23, 2020 (DE) .......................... 102020216568.8

(51) Int. Cl.
*B60S 1/38* (2006.01)
*B60S 1/34* (2006.01)
(Continued)

(52) U.S. Cl.
CPC ........... *B60S 1/3862* (2013.01); *B60S 1/3415* (2013.01); *B60S 1/4067* (2013.01); *B60S 1/407* (2013.01);
(Continued)

(58) Field of Classification Search
CPC ...... B60S 1/3862; B60S 1/4067; B60S 1/407; B60S 1/4074; B60S 1/4077; B60S 1/524;
(Continued)

(56) References Cited

U.S. PATENT DOCUMENTS

| 2014/0331434 A1* | 11/2014 | Shimoyama | B60S 1/381 15/250.04 |
| 2014/0331435 A1* | 11/2014 | Izabel | B60S 1/3862 15/250.32 |
| 2020/0384955 A1* | 12/2020 | Rapp | B60S 1/3479 |

FOREIGN PATENT DOCUMENTS

DE 102019212230 * 2/2021

* cited by examiner

*Primary Examiner* — Gary K. Graham
(74) *Attorney, Agent, or Firm* — Michael Best & Friedrich LLP (57) ABSTRACT

A wiper device (10) with at least one wiper blade adapter (12), which has at least one fluidic connecting element (22), with at least one wiper arm adapter (14), with at least one covering unit (16), which is connected to the wiper arm adapter (14) such that it can be pivoted about a pivot axis (46) with respect to the wiper arm adapter (14), with at least one fluidic coupling element (24) for fluidic connection to the at least one fluidic connecting element (22), and with a mounting unit (25) for movably mounting the fluidic coupling element (24) on the at least one covering unit (16), wherein the mounting unit (25) has at least one mounting recess (54, 54') and at least one mounting extension (52, 52') guided in the at least one mounting recess (54, 54'), the mounting recess (54, 54') being arranged on the fluidic coupling element (24).

16 Claims, 5 Drawing Sheets

(51) Int. Cl.
  *B60S 1/40*  (2006.01)
  *B60S 1/52*  (2006.01)
(52) U.S. Cl.
  CPC .............. *B60S 1/4077* (2013.01); *B60S 1/524* (2013.01); *B60S 2001/3843* (2013.01)
(58) Field of Classification Search
  CPC  B60S 1/522; B60S 1/3415; B60S 2001/4058; B60S 2001/4061; B60S 1/3843
  USPC ..................................................... 15/250.04
  See application file for complete search history.

WINDSHIELD WIPER AND A WIPER DEVICE

BACKGROUND OF THE INVENTION

A wiper device with at least one wiper blade adapter, which has at least one fluidic connecting element, with at least one wiper arm adapter, with at least one covering unit, which is connected to the wiper arm adapter such that it can be pivoted about a pivot axis with respect to the wiper arm adapter, with at least one fluidic coupling element for fluidic connection to the at least one fluidic connecting element, and with a mounting unit for movably mounting the fluidic coupling element on the at least one covering unit, wherein the mounting unit has at least one mounting recess and at least one mounting extension, which is guided in the at least one mounting recess, has already been proposed.

SUMMARY OF THE INVENTION

The invention proceeds from a wiper device with at least one wiper blade adapter, which has at least one fluidic connecting element, with at least one wiper arm adapter, with at least one covering unit, which is connected to the wiper arm adapter such that it can be pivoted about a pivot axis with respect to the wiper arm adapter, with at least one fluidic coupling element for fluidic connection to the at least one fluidic connecting element, and with a mounting unit for movably mounting the fluidic coupling element on the at least one covering unit, wherein the mounting unit has at least one mounting recess and at least one mounting extension, which is guided in the at least one mounting recess.

It is proposed that the at least one mounting recess is arranged on the fluidic coupling element.

A "wiper device" is intended to be understood as meaning preferably at least one part, preferably a subassembly, of a windshield wiper. It is preferably possible for the wiper device to also comprise the entire windshield wiper, in particular with a wiper blade. The wiper device is preferably provided for use on a vehicle. The wiper device, in particular as part of the windshield wiper, is preferably provided for cleaning a surface, preferably a windshield on a vehicle. The wiper device is preferably coupled to a vehicle, preferably a wiper arm of a vehicle, for the purpose of cleaning a vehicle windshield. "Provided" is intended to be understood as meaning preferably specially configured, specially designed and/or specially equipped. An object being provided for a particular function is intended to be understood as meaning preferably that the object fulfills and/or performs this specific function in at least one application state and/or operating state. An "operating state" is intended to be understood as meaning preferably a state in which the wiper device is ready for operation for a wiping procedure and/or a wiping operation and/or is coupled at least to a wiper arm and/or a wiper blade and/or is in a wiping operation, in which a wiper strip unit of the wiper device, in particular of the windshield wiper, is guided preferably over a vehicle windshield and, in the process, advantageously lies against the vehicle windshield.

The wiper arm adapter preferably has a longitudinal axis, which is aligned at least substantially parallel to a longitudinal axis of the wiper arm. A "longitudinal axis" of an object is intended to be understood as meaning preferably an axis which is aligned parallel to a longest edge of a smallest geometric cuboid that just still completely encloses the object. The longitudinal axis preferably runs through a geometric center point of the cuboid. "Substantially parallel" is intended to be understood as meaning preferably an alignment of a direction relative to a reference direction, in particular in a plane, in which the direction deviates from the reference direction in particular by less than 8°, advantageously less than 5° and particularly advantageously less than 2°. It is preferably the case that the wiper arm adapter is connected, in particular captively, preferentially in one piece, to the wiper arm. "In one piece" is intended to be understood as meaning preferably at least materially bonded, for example by a welding process, an adhesive-bonding process, a molding-on process and/or some other process that appears to be appropriate to a person skilled in the art, and/or advantageously shaped in one piece, such as for example by being produced from one mold and/or by being produced in a single-component or multi-component injection-molding process and advantageously from a single blank. The wiper arm adapter is preferably in the form of a side-lock adapter. The wiper arm adapter preferably comprises at least one pin element. The at least one pin element is preferably provided for mechanical coupling, in particular for pivotable mounting, of the wiper blade adapter to the wiper arm adapter, in particular on the wiper arm adapter. The at least one pin element preferably defines a coupling pivot axis. The coupling pivot axis is preferably aligned at least substantially perpendicularly to a longitudinal axis of the wiper arm adapter, in particular of the wiper arm. The expression "substantially perpendicularly" is intended to be defined as meaning preferably an alignment of a direction relative to a reference direction, in which the direction and the reference direction, in particular as seen in a projection plane, form an angle of 90° and the angle at most deviates by in particular less than 30°, advantageously less than 20° and particularly advantageously less than 15°. A longitudinal axis of the pin element is preferably aligned substantially perpendicularly to the longitudinal axis of the wiper arm adapter. The longitudinal axis of the pin element is preferably aligned substantially parallel to a transverse axis of the wiper arm adapter. The coupling pivot axis is preferably aligned parallel to a transverse axis of the covering unit. The wiper arm adapter preferably has a retaining yoke. A longitudinal axis of the at least one retaining yoke is preferably aligned parallel to the transverse axis of the covering unit, in particular to the longitudinal axis of the pin element.

The wiper blade adapter preferably has at least one mechanical connecting element for connection to the wiper arm adapter, in particular to the pin element of the wiper arm adapter. The mechanical connecting element of the wiper blade adapter is preferably provided for receiving the at least one pin element of the wiper arm adapter. The at least one mechanical connecting element is preferably provided for pivotably mounting the at least one pin element. The at least one mechanical connecting element preferably has at least one recess for receiving the at least one pin element. The at least one recess preferably at least largely forms the at least one mechanical connecting element. The at least one coupling pivot axis preferably runs, in particular centrally, through the at least one recess of the mechanical connecting element. The at least one wiper blade adapter, in particular the at least one wiper blade, is preferably mounted on the at least one wiper arm adapter pivotably about the coupling pivot axis, in particular with respect to the at least one wiper arm.

The covering unit preferably comprises a cap element, which is provided for at least partially, preferably at least largely, covering the wiper blade adapter, in particular the wiper arm adapter. The at least one cap element is preferably provided for covering at least the at least one fluidic coupling element and the at least one fluidic connecting element. The cap element is in particular formed by a shell-like covering cap. The covering unit is preferably connected captively to the wiper arm, in particular to the wiper arm adapter. The pivot axis is preferably aligned parallel to the coupling pivot axis. The pivot axis is preferably spaced apart from the coupling pivot axis. In particular, the pivot axis and the coupling pivot axis are two different axes. The fluidic coupling element is preferably connected to the cap element such that it can be moved, in particular can be transversely displaced, with respect to the cap element. The covering unit may have a frame unit, which may be provided for connection, in particular displacable connection, to the cap element. In particular, the fluidic coupling element may be connected to the frame unit such that it can be moved, in particular can be transversely displaced, with respect to the frame unit. The fluidic coupling element may be movably, in particular transversely displacably, connected to the frame unit and, in particular directly, unconnected to the at least one cap element. The at least one fluidic coupling element may be connected in the same way to the frame unit as to the cap element. The at least one fluidic connecting element is preferably in the form of a plug socket, in particular a plug-in coupling, of the wiper blade adapter. A connection direction, in particular a plug-in direction, of the at least one fluidic connection element is preferably aligned perpendicularly to the longitudinal axis of the wiper arm adapter, in particular of the wiper arm, in particular of the wiper blade adapter, in particular of the wiper blade, preferably at least in the connected state. The at least one fluidic connecting element is preferably formed such that it can be connected to and/or released from the at least one fluidic coupling element by pivoting the covering unit, in particular about the pivot axis. The fluidic connecting element preferably forms at least one fluid inlet on the wiper blade adapter. At least one, preferably at least two, in particular fluidically separate, fluid channels preferably run through the wiper blade adapter, in particular to operate two wiper directions of the wiper blade with wiping water. The wiper blade adapter, in particular each fluid channel, is preferably fluidically connected to a channel unit of the wiper strip unit and/or a wind deflector unit. The wiper blade adapter preferably has at least one fluid output element, in particular at least one fluid output nozzle. The wiper blade adapter preferably has an electrical female connecting element. The at least one fluidic coupling element preferably delimits at least one fluid channel, which is formed in particular as angled, preferably at least by 45°, particularly preferably at least by 90°. A connection direction, in particular a plug-in direction, of the at least one fluidic coupling element is preferably aligned perpendicularly to a longitudinal axis of the covering unit, in particular of the wiper arm adapter, in particular of the wiper arm, in particular of the wiper blade adapter, in particular of the wiper blade, preferably at least in the connected state. The at least one fluidic coupling element is preferably formed such that it can be connected to and/or released from the at least one fluidic connecting element by pivoting the covering unit, in particular about the pivot axis. The fluidic coupling element is preferably connected to the covering unit, in particular to the cap element, at least rotatably with respect to the covering unit, in particular the cap element, in particular at least by 2°, preferably at least by 5°, particularly preferably at least by 10° and very particularly preferably at least by 15°. The at least one fluidic coupling element is preferably mounted on the at least one covering unit transversely displacable with respect to the at least one covering unit. The at least one fluidic coupling element is preferably mounted in a two-dimensionally floating manner. The at least one fluidic coupling element can preferably follow a pivoting movement of the wiper blade adapter with respect to the wiper arm adapter about the coupling pivot axis in a connected state of the at least one coupling element and the at least one fluidic connecting element by virtue of a movable, in particular transversely displacable, mounting. The at least one fluidic coupling element is preferably mounted in a two-dimensionally floating manner on the covering unit, in particular the cap element. The at least one fluidic coupling element is preferably mounted in a mounting plane in a floating manner on the covering unit, in particular the cap element. The mounting plane is preferably a geometric plane which is aligned perpendicularly to the transverse axis of the covering unit, in particular perpendicularly to the coupling pivot axis, in particular perpendicularly to the pivot axis. The at least one fluidic coupling element is preferably mounted on the at least one covering unit, in particular on the cap element, in the mounting plane such that said fluidic coupling element can be transversely displaced with respect to the at least one covering unit. A movement clearance of the at least one fluidic coupling element along a longitudinal axis of the covering unit, in particular of the cap element, is preferably smaller than a movement clearance of the at least one fluidic coupling element in the mounting plane at least substantially perpendicular to the longitudinal axis of the covering unit, in particular of the cap element. It is preferable for the at least one fluidic coupling element to be movable in the mounting plane along the longitudinal axis of the covering unit, in particular of the cap element, by at most 0.3 cm, preferably at most 0.2 cm. It is preferable for the at least one fluidic coupling element to be movable in the mounting plane perpendicularly to the longitudinal axis of the covering unit, in particular of the cap element, by at most 1 cm, preferably at most 0.5 cm. It is preferable for the at least one fluidic coupling element to be movable in the mounting plane perpendicularly to the longitudinal axis of the covering unit, in particular of the cap element, by at least 0.1 cm, preferably at least 0.2 cm. The mounting unit preferably comprises at least two, in particular similar, mounting recesses. The mounting unit preferably comprises at least two, in particular similar, mounting extensions. The at least one mounting extension is preferably fitted in the at least one mounting recess. The at least one fluidic coupling element is preferably movably mounted, in particular captively, on the covering unit, preferably on the cap element, by virtue of the mounting unit, preferably by virtue of the at least one mounting extension, preferably by virtue of the at least two mounting extensions, which is fitted in the at least one mounting recess, preferably the at least two mounting recesses. As an alternative, the at least one fluidic coupling element may be movably mounted, in particular captively, on the frame unit by virtue of the mounting unit, preferably by virtue of the at least one mounting extension, preferably by virtue of the at least two mounting extensions, which is/are fitted in the at least one mounting recess, preferably the at least two mounting recesses.

At least two mounting recesses, in particular analogous to one another, are preferably arranged on the at least one fluidic coupling element. The at least one fluidic coupling element preferably delimits the at least one mounting recess. The at least one fluidic coupling element preferably delimits at least two mounting recesses. The at least two mounting recess, in particular analogous to one another, are preferably arranged in a line with one another along the pivot axis, in particular along the coupling pivot axis, in particular on the at least one fluidic coupling element.

The configuration according to the invention of the wiper device makes it possible to achieve an advantageously movable fluidic coupling element. In particular, an advantageously movable wiper blade can be achieved. An advantageous movability, in particular pivotability, of a pivotably mounted wiper blade on a wiper arm adapter, in particular on a side-lock adapter, can be achieved. In particular, a wiper device for particularly curved or particularly dimensioned vehicle windshields can be achieved. An advantageous, in particular advantageously limited, movability of the fluidic coupling element with respect to the covering unit, in particular to the cap element, can be achieved. In particular, an advantageous movability, restricted to one plane, of the fluidic coupling element with respect to the cap element, in particular to the covering cap, can be achieved.

It is furthermore proposed that the at least one mounting extension is formed in one piece with the covering unit. The at least one mounting extension is preferably formed in one piece with the cap element. The at least one cap element preferably forms at least one, preferably at least two, mounting extensions, in particular for being fitted in the at least one mounting recess, in particular the at least two mounting recesses. A respective material portion of the at least one cap element preferably forms at least two mounting extensions, in particular analogous to one another. The at least two mounting extensions are preferably arranged in a line with one another along the pivot axis, in particular on the cap element. The cap element preferably has at least two cap extensions, which extend perpendicularly to the pivot axis from a cap cover portion in the direction of the wiper blade adapter. The at least one mounting extension is preferably arranged on one of the at least two cap extensions. An advantageous arrangement of the at least one mounting extension can be achieved. In particular, it can be achieved that the movable fluidic coupling element has a strengthened form compared to an embodiment in which the at least one mounting extension is formed in one piece with the fluidic coupling element.

It is further proposed that the at least one fluidic coupling element is at least partially in the form of a fluidic plug element, wherein the at least one mounting recess is arranged along a longitudinal axis, in particular the longitudinal axis already mentioned, of the covering unit in an offset manner in relation to the plug element. The fluidic coupling element is preferably at least partially in the form of a plug element, in particular a plug-in coupling element. The fluidic coupling element is preferably connected to at least one fluid feed line of the wiper arm. The at least one fluidic coupling element is preferably in the form of an end piece of the at least one fluid feed line of the wiper arm. The at least one mounting recess is preferably arranged along the longitudinal axis of the cap element, in particular of the wiper arm adapter, in particular of the wiper blade adapter, in particular of the wiper arm, in an offset manner in relation to the plug element. An advantageous displacement of an imaginary mounting axis, which connects the mounting recesses, can be achieved in a region which does not cross the at least one fluidic plug element. In particular, it is possible to achieve an advantageous movability of the wiper blade adapter with respect to the wiper arm adapter, the fluidic coupling element remaining connected in an advantageously fixed manner, in particular in a fluidically tight manner at a high fluid pressure. It is possible to achieve a movable mounting of the fluidic coupling element that is advantageously easy to achieve, in particular to assemble.

It is furthermore proposed that the at least one fluidic coupling element is at least partially in the form of a fluidic plug element and comprises at least one connecting web, which extends at least substantially along a longitudinal axis of the covering unit and delimits the at least one mounting recess. The at least one connecting web preferably extends from the plug element along the longitudinal axis of the covering unit, in particular of the cap element, in particular of the wiper arm adapter, in particular of the wiper blade adapter, in particular of the wiper arm. Preferably, the at least one connecting web on a side facing away from the plug element, in particular at a free end, in particular an end facing away from the plug element, delimits the at least one mounting recess. An advantageous lever mounting can be achieved. In particular, it can be achieved that the dimensions of the mounting recess and of the mounting extension can be kept advantageously small.

It is further proposed that the at least one fluidic coupling element comprises at least two connecting webs, which extend at least substantially along a longitudinal axis of the covering unit, and has at least one stabilizing web, which connects the at least two connecting webs. The at least one stabilizing web is preferably connected to the connecting webs respectively on a side, facing away from the plug element, of the mounting recess. A longitudinal axis of the stabilizing web is preferably aligned parallel to the pivot axis and/or to the coupling pivot axis. An advantageous stability at an end, facing away from the plug element, of the fluidic coupling element can be achieved. In particular, it is possible to achieve for the mounting recess advantageously long-lasting latching properties for receiving the mounting extensions. An advantageously stable connection of the fluidic coupling element to the covering unit can be achieved.

It is furthermore proposed that the wiper arm adapter has at least one pin element, in particular the pin element already mentioned, and at least one electrical male coupling element, which is latched on the at least one pin element such that it can be pivoted about the pin element. The at least one electrical male coupling element is preferably arranged at an end, facing away from the wiper arm, of the wiper arm adapter. The at least one electrical male coupling element can preferably be pivoted about the pin element by at least 70°. The effect can be obtained that an electrical connection can be achieved advantageously easily by way of a mechanical connection of the wiper blade adapter to the wiper arm adapter.

It is further proposed that the at least one fluidic coupling element comprises at least one valve element. The at least one valve element is preferably in the form of a non-return valve. The at least one fluidic coupling element preferably has at least two valve elements. The at least one valve element is preferably arranged in the interior of the at least one fluidic coupling element. The at least one valve element is preferably arranged in the at least one fluid channel delimited by the fluidic coupling element. A respective valve element is preferably arranged in a respective one of two fluid channels delimited by the fluidic coupling element. It is possible to achieve a situation whereby the wiper blade adapter can be advantageously quickly supplied with wiping liquid. In addition, it is possible particularly advantageously to achieve a weight displacement on the fluidic coupling element, which is fitted on the cap element. An advantageous alignment of the plug or of the plug coupling formed by the fluidic coupling element can be achieved, in particular in an open state.

It is furthermore proposed that the at least one covering unit has a cap element, in particular the cap element already mentioned, for covering the wiper blade adapter, which cap element forms a wind deflector geometry for making use of a relative wind in order to press the wiper device against a windshield. The at least one cap element is preferably shaped so as to form the wind deflector geometry. The at least one cap element preferably has a concave curved outer surface that faces away from the wiper blade adapter. It is possible to achieve a situation whereby the outer surface of the covering unit is advantageously included in the generation of a contact force.

Furthermore, a fluidic coupling element of a wiper device according to the invention is proposed.

Furthermore, a method is proposed for assembling a wiper device according to the invention. In at least one method step, the at least one electrical male coupling element is preferably pivoted to form a latching connection between the wiper arm adapter and the pin element. In at least one method step, preferably the wiper blade adapter by way of the mechanical connecting element is slid onto the pin element and the electrical female connecting element of the wiper blade adapter is connected to the electrical male coupling element by way of a translational sliding movement. In at least one method step, preferably the wiper blade adapter by way of the electrical male coupling element is pivoted about the pin element, in particular about the coupling pivot axis, on the retaining yoke. In at least one method step, preferably the cap element is pivoted onto the wiper blade adapter and the wiper arm adapter is pivoted about the pivot axis. In at least one method step, preferably the covering unit is fitted by a partial displacement of the covering unit on the retaining yoke in order to block a pivoting of the covering unit. An advantageously uncomplicated assembly of the wiper device can be achieved. The fluidic coupling element preferably has two valve elements in its interior to ensure a reaction time for a fluid output. The fluidic coupling element preferably has two retaining elements for two heating loops, which fix a respective one of the heating lines to ensure that fluid feed lines can be heated.

The wiper device according to the invention, the fluidic coupling element according to the invention and/or the method according to the invention are/is not intended here to be restricted to the application and embodiment described above. In particular, in order to perform a way of functioning described herein, the wiper device according to the invention, the fluidic coupling element according to the invention and/or the method according to the invention may have a number of individual elements, components and units, and also method steps, that differs from a number mentioned herein. Moreover, in the value ranges specified in this disclosure, values lying within the mentioned limits are also to be considered to be disclosed and arbitrarily usable.

BRIEF DESCRIPTION OF THE DRAWINGS

Further advantages will emerge from the following description of the drawing. The drawing illustrates an exemplary embodiment of the invention. The drawing, the description and the claims contain numerous features in combination. A person skilled in the art will also expediently consider the features individually and combine them to form appropriate further combinations.

In the figures.

DETAILED DESCRIPTION

Figure 1:
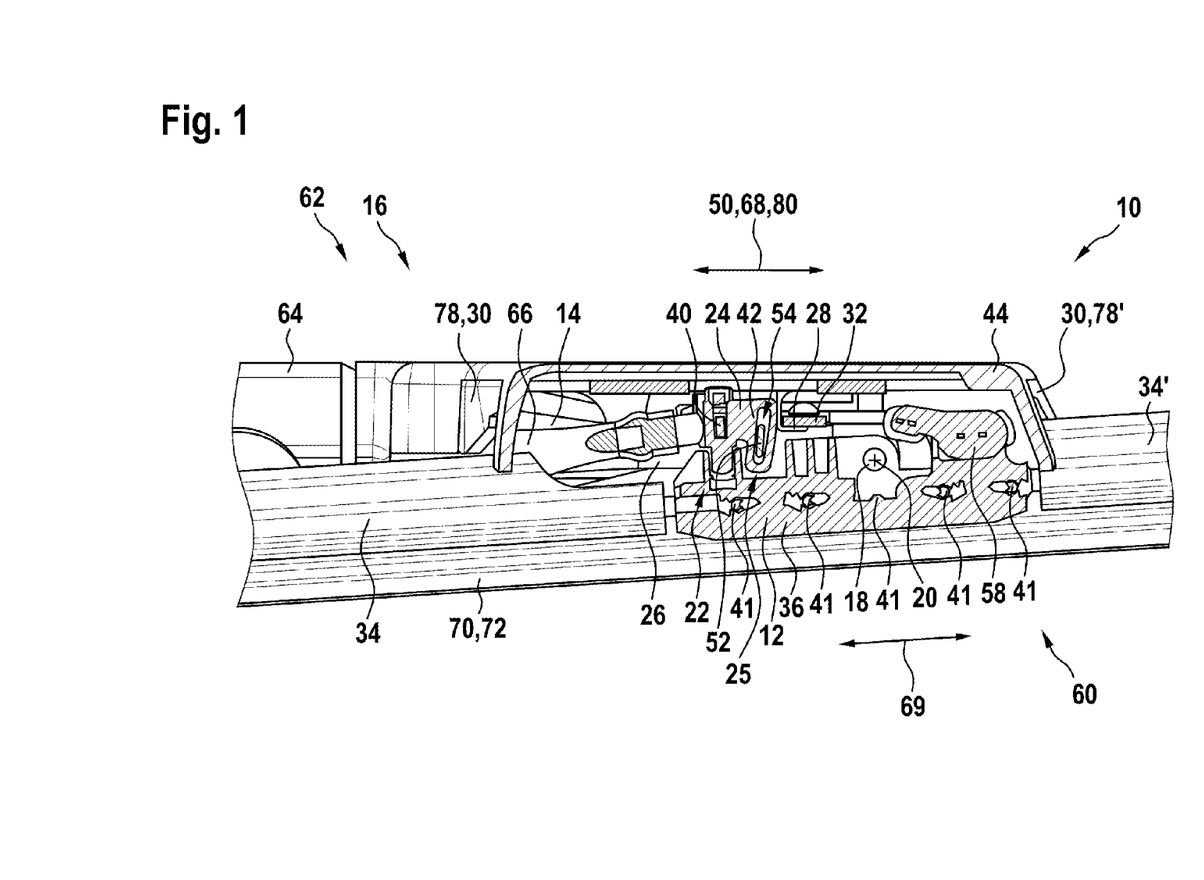
FIG. 1 shows a wiper device according to the invention in a schematic sectional illustration.

FIG. 1 shows a windshield wiper 62. The windshield wiper 62 comprises a wiper arm 64. The windshield wiper 62 comprises a wiper blade 60. The windshield wiper 62 comprises at least one wiper device 10. The windshield wiper 62 comprises a fluid feed line 66 (not shown in any more detail). The fluid feed line 66 is arranged along the wiper arm 64. The fluid feed line 66 is connected to the wiper arm 64 in portions along the wiper arm 64. The fluid feed line 66 is provided for supplying the wiper blade 60 with wiping water. A wiper arm adapter 14 of the wiper device 10 is arranged on the wiper arm 64. The wiper arm adapter 14 is connected in one piece to the wiper arm 64. The wiper blade 60 comprises at least one wiper strip unit 70, in particular with a wiper lip 72. The wiper blade 60 comprises two spring rails (not shown). As an alternative, the wiper blade 60 may comprise only one spring rail. The wiper blade 60 comprises two spoiler elements 34, 34'. The wiper blade 60 comprises two wiper-blade end caps (not shown).

The wiper device 10 comprises at least the wiper arm adapter 14. The wiper device 10 comprises at least one wiper blade adapter 12. The wiper device 10 comprises a covering unit 16. The wiper arm adapter 14 is in the form of an end piece of the wiper arm 64 along a longitudinal axis 80 of the wiper arm 64. The wiper arm adapter 14 comprises a pin element 18. The pin element 18 is provided for movably mounting the wiper blade adapter 12 on the wiper arm adapter 14. The pin element 18 defines a coupling pivot axis 20. The coupling pivot axis 20 is aligned parallel to a maximum transverse extent of the wiper arm adapter 14 and/or of a wiper blade adapter 12 and/or of the wiper arm 64. The coupling pivot axis 20 is aligned perpendicularly to a longitudinal axis 68, 69 of the wiper arm adapter 14, in particular of the wiper blade 60 and/or of the wiper arm 64 and/or of the wiper blade adapter 12. The pin element 18 has a maximum longitudinal extent which is aligned parallel to a maximum transverse extent of the wiper arm adapter 14 and/or of the wiper blade adapter 12 and/or of the wiper arm 64.

The wiper arm adapter 14 has a retaining yoke 32. The retaining yoke 32 is provided for securing a connection of the wiper arm adapter 14 to the wiper blade adapter 12 axially with respect to the coupling pivot axis 20. The retaining yoke 32 has an end that is angled, in particular by 90°. The retaining yoke 32 has a maximum longitudinal extent which is aligned parallel to a maximum transverse extent of the wiper arm adapter 14 and/or of the wiper blade adapter 12 and/or of the wiper arm 64. The wiper arm adapter 14 has an electrical male coupling element 56 which is latched on the at least one pin element 18 such that it can be pivoted about the pin element 18 (cf. FIG. 3 and FIG. 4).

The wiper device 10 comprises at least the wiper blade adapter 12. The wiper blade adapter 12 is arranged between the spoiler elements 34, 34'. The wiper blade adapter 12 comprises a basic body 36. The wiper blade adapter 12, in particular the basic body 36, is connected to the wiper strip unit 70. The wiper blade adapter 12 is connected to the spring rails. The spring rails stabilize the wiper strip unit 70 of the wiper blade 60 along the longitudinal axis 69 of the wiper blade 60, in particular over the entire maximum longitudinal extent of the wiper strip unit 70.

The wiper blade adapter 12 has at least one fluidic connecting element 22. The fluidic connecting element 22 forms two fluid inlets on the basic body 36 of the wiper blade adapter 12. Two, in particular fluidically separate, fluid channels of the wiper blade adapter 12 run through the basic body 36, in particular to operate two wiping directions of the wiper blade 60 with wiping water. The basic body 36, in particular each fluid channel, is fluidically connected to a channel unit of the wiper strip unit 70 and/or of the spoiler elements 34, 34'. The basic body 36 has five fluid output elements 41, in particular fluid output nozzles. The wiper blade adapter 12, in particular the basic body 36, has at least one mechanical connecting element 38. The mechanical connecting element 38 is provided for receiving the pin element 18 of the wiper arm adapter 14 and for mounting said pin element in particular pivotably, in particular about the coupling pivot axis 20. The wiper blade adapter 12 has an electrical female connecting element 58, in particular for electrical connection to the electrical male coupling element 56.

Figure 2:
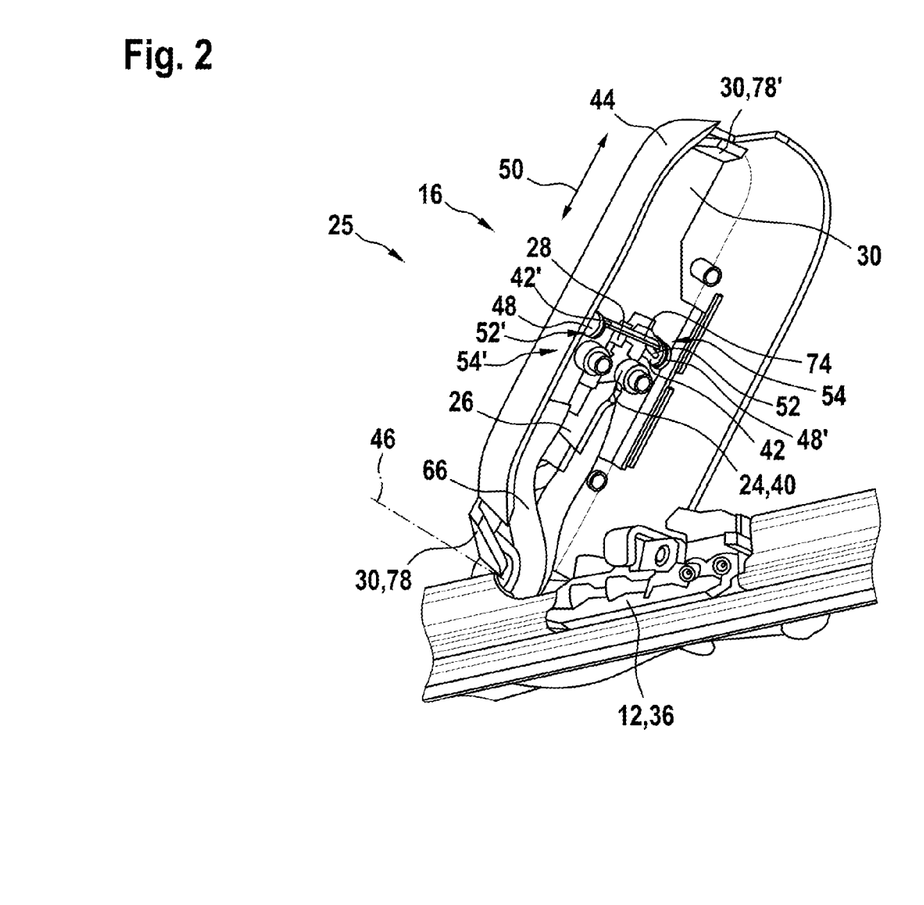
FIG. 2 shows the wiper device according to the invention in a schematic illustration.

FIGS. 1, 2, 3 and 4 show in particular the covering unit 16 of the wiper device 10 from various perspectives and/or in different illustrations. The covering unit 16 comprises a cap element 44. The cap element 44 is formed integrally, for example. The covering unit 16 is connected to the wiper arm adapter 14. The covering unit 16 is connected movably to the wiper arm adapter 14. The covering unit 16 is connected to the wiper arm adapter 14 such that said covering unit can be pivoted about a pivot axis 46. The covering unit 16 is connected to the wiper arm adapter 14 such that it can be pivoted about a pivot axis 46 with respect to the wiper arm adapter 14. FIG. 1 shows the covering unit 16 in an unpivoted state on the wiper arm adapter 14. FIG. 2 shows the covering unit 16, in particular with a fluid-blocking element 26 and a cover fixing element 28. The covering unit 16 comprises the fluid-blocking element 26 and the cover fixing element 28.

Figure 3:
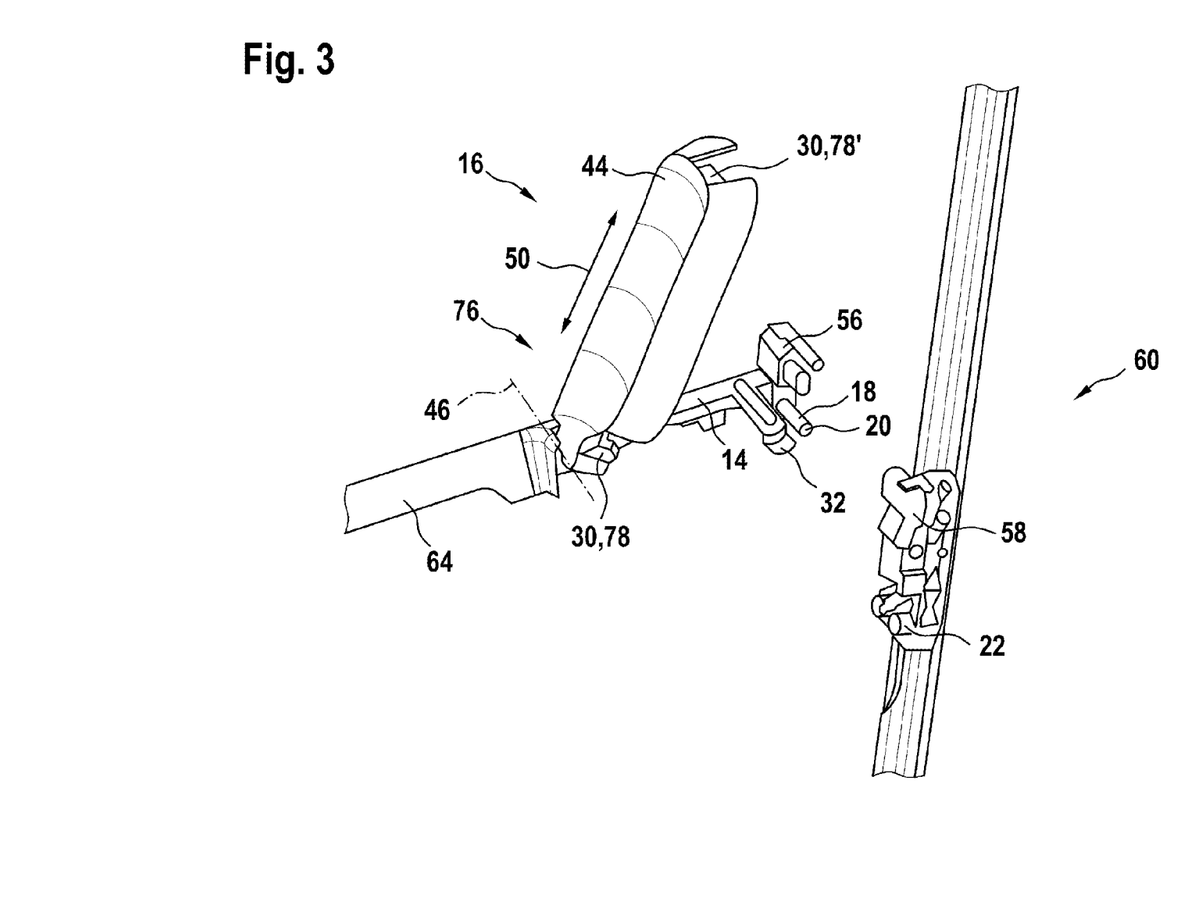
FIG. 3 shows the wiper device according to the invention in a schematic illustration.
Figure 4:
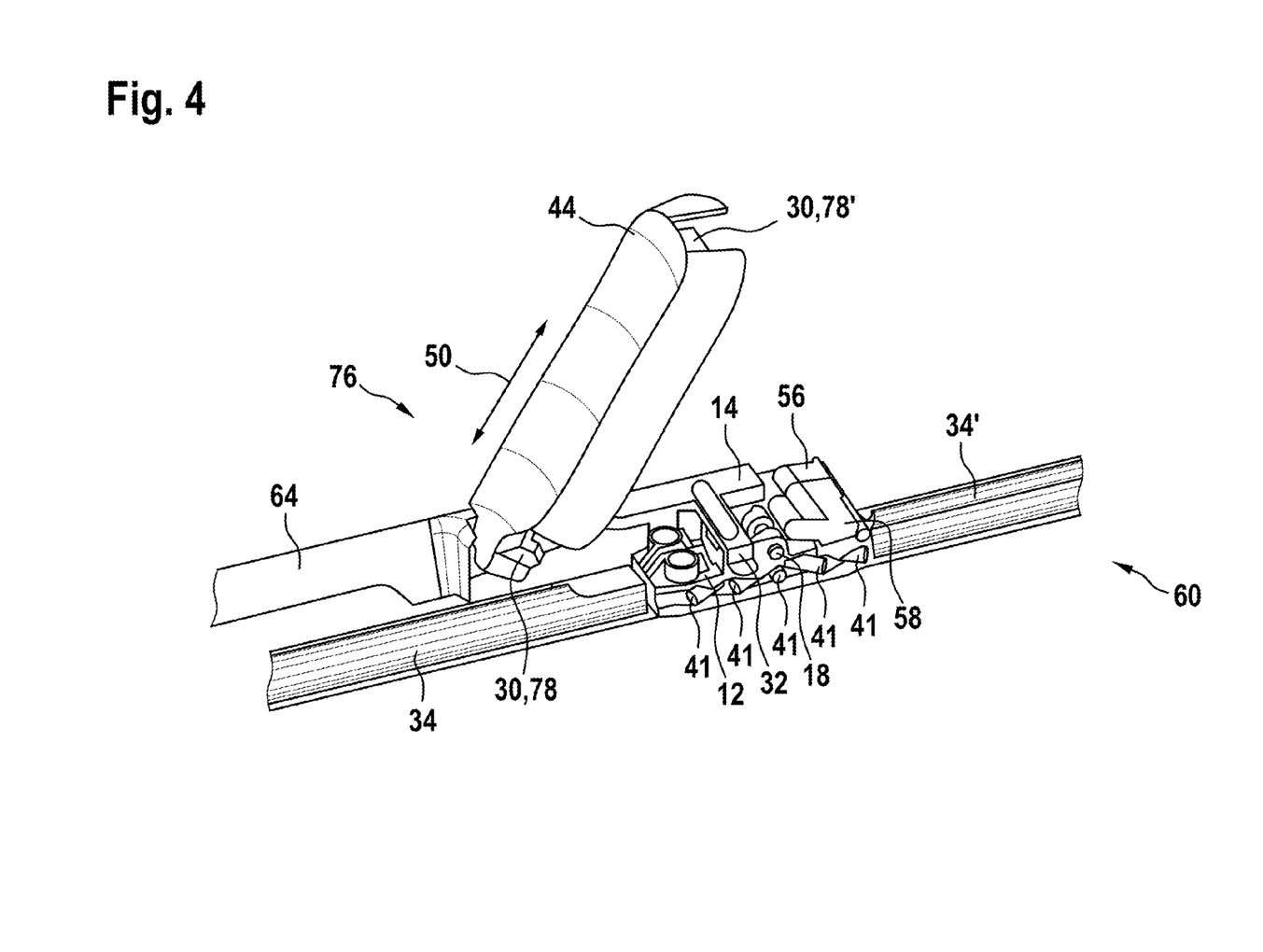
FIG. 4 shows the wiper device according to the invention in a schematic illustration.

FIGS. 1, 2 and 3 show the covering unit 16 in a pivoted, in particular pivoted-open, state on the wiper arm adapter 14. In particular, the cap element 44 is connected to the wiper arm adapter 14 such that said cap element can be pivoted, in particular about the pivot axis 46. The cap element 44, in particular the covering unit 16, is connected non-displacably to the wiper arm adapter 14.

The wiper device 10 comprises at least one fluidic coupling element 24. The fluidic coupling element 24 is fluidically connected to the fluid feed line 66 of the windshield wiper 62. In particular, the fluidic coupling element 24 is in the form of an end piece of the fluid feed line 66. The fluidic coupling element 24 is provided for fluidic connection to the fluidic connecting element 22. By pivoting the covering unit 16, the fluidic coupling element 24 can be fluidically connected to or released from the fluidic connecting element 22. The fluidic coupling element 24 comprises two valve elements, which in particular are arranged in a respective fluid channel in the fluidic coupling element 24.

The fluidic coupling element 24 is mounted on the cap element 44. The wiper device 10 comprises a mounting unit 25. The mounting unit 25 is provided for movably mounting the fluidic coupling element 24 on the covering unit 16, in particular on the cap element 44. The mounting unit 25 has two mounting recesses 54, 54'. The mounting unit 25 has two mounting extensions 52, 52'. The two mounting extensions 52, 52' are guided in the two mounting recesses 54, 54'. The two mounting extensions 52, 52' are formed in one piece with the cap element 44. The cap element 44 forms two retaining extensions 48, 48', which in particular extend in the direction of the wiper blade adapter 12 of the wiper blade 60 (cf. FIG. 2). The retaining extensions 48, 48' are aligned perpendicularly to a longitudinal axis 50 of the covering unit 16. A respective mounting extension 52, 52' of the mounting unit 25 is arranged centrally on the retaining extensions 48, 48'.

The two mounting recesses 54, 54' are arranged on the fluidic coupling element 24. The mounting recesses 54, 54' are delimited by the fluidic coupling element 24. The mounting recesses 54, 54' are delimited to a maximum extent which is aligned perpendicularly to the longitudinal axis 50 of the covering unit 16. The two mounting recesses 54, 54' are formed as respectively symmetrical, in particular at least substantially with a cuboidal outer contour. The two mounting recesses 54, 54' have analogous forms, in particular have the same form. The two mounting recesses 54, 54' are arranged on opposite sides, in particular along the pivot axis 46, of the covering unit 16, in particular of the cap element 44. The mounting recesses 54, 54' may be delimited to different extents along the longitudinal axis 50 of the covering unit 16. In particular, the two mounting recesses 54, 54' may be delimited to a shorter extent parallel to the longitudinal axis 50 of the covering unit 16 at an end facing toward the wiper blade adapter 12 than at an end, facing away from the at least one wiper blade adapter 12, of the mounting recesses 54, 54'.

The cap element 44 forms the two mounting extensions 52, 52', in particular for being fitted in the at least one mounting recess, in particular the two mounting recesses, 54, 54' on the fluidic coupling element 24 (cf. FIG. 1 and FIG. 3). The mounting extensions 52, 52' are formed in one piece with the covering unit 16, in particular the cap element 44, in particular the retaining extensions 48, 48'. The mounting extensions 52, 52' extend parallel to the coupling pivot axis 20, in particular to the pivot axis 46, in particular perpendicularly to the longitudinal axis 50 of the covering unit 16. The mounting extensions 52, 52' of the fluidic coupling element 24 have a longitudinal shape in a section in particular as seen along a plane perpendicular to the longitudinal axis 50 of the covering unit 16.

The fluidic coupling element 24 has at least one fluidic plug element 40. The fluidic coupling element 24 comprises two connecting webs 42, 42' that extend along the longitudinal axis 50 of the covering unit 16. The connecting web 42, 42' delimits the at least one mounting recess 54, 54'. Each of the two connecting webs 42, 42' delimits a respective one of the two mounting recesses 54, 54'. The two mounting recesses 54, 54' are arranged along the longitudinal axis 50 of the covering unit 16 in an offset manner in relation to the plug element 40 (cf. FIG. 1). The fluidic coupling element 24 has a stabilizing web 74, which connects the at least two connecting webs 42, 42' (cf. FIG. 2). The stabilizing web 74 extends along the pivot axis 46 to connect the two connecting webs 42, 42'. The mounting recess 54, 54' is arranged closer to the coupling pivot axis 20 than the plug element 40 of the fluidic coupling element 24 is.

The fluidic coupling element 24 is mounted on the at least one covering unit 16 such that it is movable with respect to the at least one covering unit 16. The at least one fluidic coupling element 24 is mounted on the at least one covering unit 16 such that it is transversely displacable with respect to the at least one covering unit 16. In particular, the fluidic coupling element 24 is mounted on the covering unit 16, in particular on the cap element 44 of the covering unit 16, in particular in the mounting recesses 54, 54', such that said fluidic coupling element is transversely displacable in a plane perpendicular to the coupling pivot axis 20, in particular to the pivot axis 46. In particular, the mounting recesses 54, 54' form a limitation of the degrees of freedom of the mounting extensions 52, 52'.

The cap element 44 forms a wind deflector geometry for making use of a relative wind to press the wiper device 10 against a windshield. The cap element 44 has a concave outer surface 76 on a side facing away from the wiper blade adapter 12.

The covering unit 16 has at least one fluid-blocking element 26. The fluid-blocking element 26 is provided for ensuring a fluidic connection of the fluidic coupling element 24 to the fluidic connecting element 22. The fluid-blocking element 26 can be pivoted with the covering unit 16 about the pivot axis 46 with respect to the wiper arm adapter 14. The fluid-blocking element 26 is covered by the cap element 44, as seen from a direction facing away from the wiper blade adapter 12. The fluid-blocking element 26 is provided for fixing the fluidic connection of the fluidic coupling element 24 to the fluidic connecting element 22. The fluid-blocking element 26 is mounted on the covering unit 16 such that said fluid-blocking element is displacable, in particular with respect to the cap element 44. The fluid-blocking element 26 is mounted such that it is displacable along the longitudinal axis 50 of the covering unit 16. The fluid-blocking element 26 is provided for engaging around the fluidic coupling element 24 in a sliding position, in particular a connecting position, in particular perpendicularly to the longitudinal axis 50 of the covering unit 16. The fluid-blocking element 26 engages behind the fluidic connecting element 22 in the connecting position, in particular as seen from the retaining yoke 32 of the wiper arm adapter 14. Optionally, the fluid-blocking element 26 in the connecting position may form a latching connection with the wiper blade adapter 12, in particular to secure the connecting position against an undesired release of the connecting position.

The covering unit 16 comprises at least one cover fixing element 28.

The cover fixing element 28 is provided for at least partially positionally fixing the at least one covering unit 16 to the at least one wiper arm adapter 14.

The cover fixing element 28 is provided for positionally fixing the at least one covering unit 16 in a pivoting position, in particular about the pivot axis 46, with respect to the at least one wiper arm adapter 14. In particular, the cover fixing element 28 is mounted movably on the cap element 44. The cover fixing element 28 is mounted displacably on the cap element 44.

The cover fixing element 28 has a hook-like form. The cover fixing element 28 is formed for engaging around the retaining yoke 32 of the wiper arm adapter 14. In a connecting position of the cover fixing element 28, the cover fixing element 28 partially engages around the retaining yoke 32. In the connecting position, the cover fixing element 28 secures the covering unit 16 against being pivoted about the pivot axis 46 with respect to the wiper arm adapter 14, in particular on the retaining yoke 32.

The wiper device 10 has at least one actuating element 30. The actuating element 30 is in the form of a slider element, in particular a slider, on, in particular at least largely in, the cap element 44.

The actuating element 30 comprises two parts, in particular actuation-button parts 78, 78', which are connected to one another in one piece. As an alternative, the actuation-button parts 78, 78' may be separate parts. The actuation-button parts 78, 78' are each arranged, as seen axially along a maximum longitudinal extent of the actuating element 30, at the level of an end of the covering unit 16. The actuation-button parts 78, 78' engage around the fluid-blocking element 26 and the cover fixing element 28 in the direction of the longitudinal axis 50 of the covering unit 16. The actuation-button parts 78, 78' each form at least one form fit, in particular a material bond, either with the at least one fluid-blocking element 26 or with the cover fixing element 28. An actuation-button part 78 facing toward the pivot axis 46 forms a form fit with the fluid-blocking element 26. The fluid-blocking element 26 is in contact with the actuation-button part 78 on one side, in particular in the direction of the longitudinal axis 50 of the covering unit 16. The side of the fluid blocking element 26 that is in contact with the actuation-button part 78 has a convexly curved form, in particular along a fluid circular arc about the coupling pivot axis 20. The side of the actuation-button part 78 that is in contact with the fluid-blocking element 26 has a concavely curved form, in particular along the fluid circular arc about the coupling pivot axis 20. The fluid circular arc about the coupling pivot axis 20 has a larger radius than the circular arc about the coupling pivot axis 20. An actuation-button part 78 facing away from the pivot axis 46 is materially bonded to the cover fixing element 28. The actuating element 30, in particular the actuation-button part 78', is connected to the at least one cover fixing element 28, in particular in one piece.

The actuating element 30 is provided for transferring the at least one fluid-blocking element 26 and the at least one cover fixing element 28 together into a connecting position and/or into a release position by virtue of a movement, in particular translational movement, of the actuating element 30 relative to the wiper arm adapter 14. Displacing one of the actuation-button parts 78, 78', in particular along the longitudinal axis 50 of the covering unit 16, also displaces the cover fixing element 28, the fluid-blocking element 26 and the respective other actuation-button part 78, 78' into a sliding position, in particular the connecting position or a release position. A release position of the fluid-blocking element 26 is a sliding position in which the fluidic connection of the fluidic coupling element 24 to the fluidic connecting element 22 is not secured by the fluid-blocking element 26. A release position of the cover fixing element 28 is a sliding position of the cover fixing element 28 in which the covering unit 16 can be pivoted about the pivot axis 46.

The fluid-blocking element 26 is connected to at least one actuating element 30 at least partially pivotably with respect to the at least one wiper arm adapter 14. In the connecting position of the fluid-blocking element 26 to the wiper blade adapter 12, the fluid-blocking element 26 can be moved, in particular can be pivoted, about the coupling pivot axis 20 with respect to the wiper arm adapter 14. In the connecting position of the fluid-blocking element 26 to the wiper blade adapter 12, the fluid-blocking element 26 can be moved, in particular can be pivoted, about the coupling pivot axis 20 with respect to the actuation-button part 78. When the fluid-blocking element 26 is pivoted in the connecting position of the fluid-blocking element 26 to the wiper blade adapter 12 about the coupling pivot axis 20 with respect to the actuation-button part 78, the connection remains by virtue of the form fit of the actuation-button part 78 with the fluid-blocking element 26, in particular by virtue of the curved shape of the outer sides. When the fluid-blocking element 26 is pivoted in the connecting position of the fluid-blocking element 26 to the wiper blade adapter 12 about the coupling pivot axis 20 with respect to the actuation-button part 78, the connection remains by virtue of the form fit of the cover fixing element 28 with the fluid-blocking element 26, in particular by virtue of the curved shape of the outer sides. The at least one fluid-blocking element 26 can be connected to the at least one wiper blade adapter 12 such that said fluid-blocking element can be moved, in particular can be pivoted, with respect to the at least one cover fixing element 28. In the connecting position of the fluid-blocking element 26 to the wiper blade adapter 12, the fluid-blocking element 26 can be moved, in particular can be pivoted, about the coupling pivot axis 20 with respect to the cover fixing element 28. In a connecting position, in particular of the cover fixing element 28 and/or of the fluid-blocking element 26, the actuating element 30 forms a latching connection with the wiper blade adapter 12. In particular, a latching element arranged on the actuation-button part 78 forms a latching connection with the cap element 44.

By displacing the actuating element 30, the fluidic connection can be secured and the covering unit 16 can be secured against being pivoted about the cover fixing unit on the wiper arm adapter 14.

The fluid-blocking element 26 follows the movement, in particular displacement, of the cover fixing element 28, in particular of the actuating element 30, preferably of the actuation-button parts 78, 78', the fluid-blocking element 26 being able to be moved, in particular pivoted, with respect to the cover fixing element 28, in particular in any sliding position. The wiper blade 60 is pivotably connected to the wiper arm adapter 14 and supplied with fluid.

The actuating element 30 may be operated via the actuation-button parts 78, 78' at the ends of the maximum extent of the cap element 44 in the direction of the longitudinal axis 50 of the covering unit 16. The actuating element 30 extends in the direction of the longitudinal axis 50 of the covering unit 16 further than the cap element 44 does. In particular, the actuation-button parts 78, 78' protrude from the cap element 44 in the direction of the longitudinal axis 50 of the covering unit 16. In particular, the actuation-button parts 78, 78' are arranged on the cap element 44 such that they are each visible from the outside.

Figure 5:
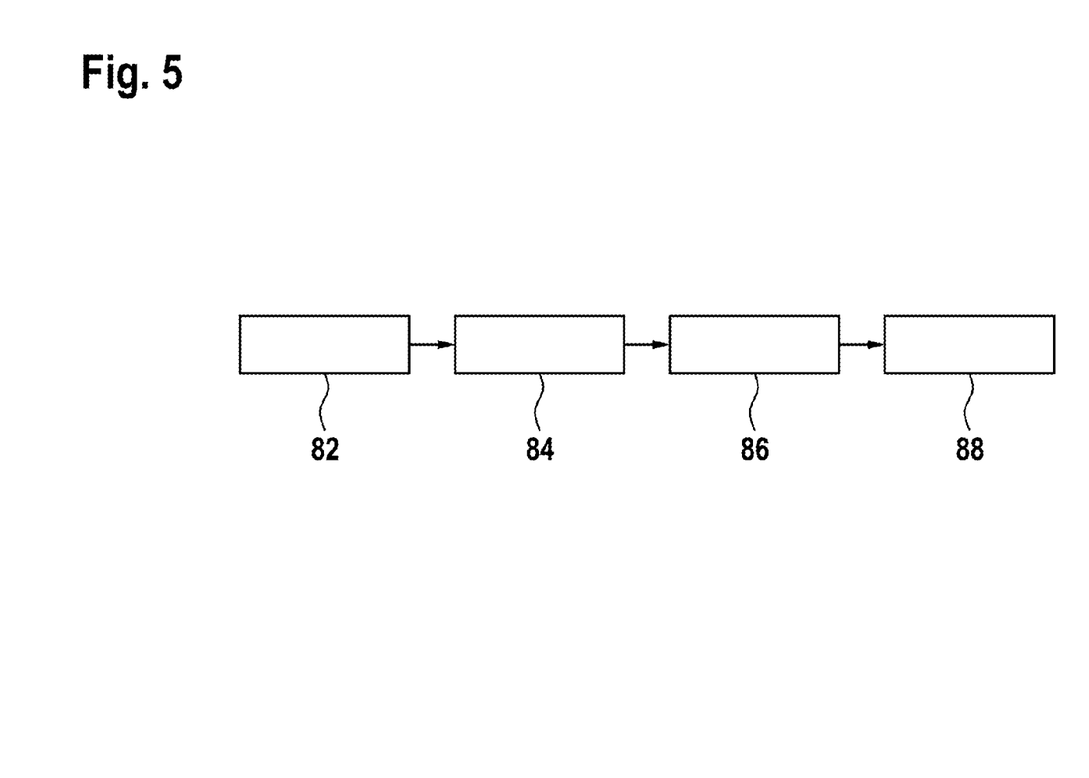
FIG. 5 shows a method for assembling the wiper device according to the invention in a schematic illustration.

FIG. 5 schematically shows a method for assembling a wiper device 10. In at least one method step, in particular a clamping step 82, the at least one electrical male coupling element 56 is pivoted to form a latching connection between the pin element 18 and the rest of the wiper arm adapter 14. In at least one method step, in particular the clamping step 82, the at least one electrical male coupling element 56 is clamped in on the wiper arm adapter 14 approximately perpendicularly to a longitudinal axis 68 of the wiper arm adapter 14 (cf. FIG. 3). In at least one method step, in particular a sliding step 84, the wiper blade adapter 12 by way of the mechanical connecting element 22 is slid onto the pin element 18 and the electrical female connecting element 58 of the wiper blade adapter 12 is connected to the electrical male coupling element 56 by way of a translational sliding movement (cf. FIG. 3 and FIG. 4). In at least one method step, in particular a pivoting-in step 86, the wiper blade adapter 12 by way of the electrical male coupling element 56 is pivoted about the pin element 18, in particular about the coupling pivot axis 20, on the retaining yoke 32. In at least one method step, in particular a blocking step 88, the cap element 44 is pivoted onto the wiper blade adapter 12 and the wiper arm adapter 14 about the pivot axis 46. In at least one method step, in particular the blocking step 88, the covering unit 16 is fitted on the retaining yoke 32 by partially displacing the covering unit 16, in particular the actuating element 30, to block a pivoting of the covering unit 16.

What is claimed is:

1. A wiper device with at least one wiper blade adapter (12), which has at least one fluidic connecting element (22), with at least one wiper arm adapter (14), with at least one covering unit (16), which is connected to the wiper arm adapter (14) such that the covering unit can be pivoted about a pivot axis (46) with respect to the wiper arm adapter (14), with at least one fluidic coupling element (24) for fluidic connection to the at least one fluidic connecting element (22), and with a mounting unit (25) for movably mounting the fluidic coupling element (24) on the at least one covering unit (16), wherein the mounting unit (25) has at least one mounting recess (54, 54') and at least one mounting extension (52, 52'), which is guided in the at least one mounting recess (54, 54'), wherein the at least one mounting recess (54, 54') is arranged on the fluidic coupling element (24).

2. The wiper device according to claim 1, wherein the at least one mounting extension (52, 52') is formed in one piece with the covering unit (16).

3. The wiper device according to claim 1, wherein the at least one fluidic coupling element (24) has at least one fluidic plug element (40), wherein the at least one mounting recess (54, 54') is arranged along a longitudinal axis (50) of the covering unit (16) in an offset manner in relation to the plug element (40).

4. The wiper device according to claim 1, wherein the at least one fluidic coupling element (24) has at least one fluidic plug element (40) and comprises at least one connecting web (42, 42'), which extends at least substantially along a longitudinal axis (50) of the covering unit (16) and delimits the at least one mounting recess (54, 54').

5. The wiper device according to claim 1, wherein the at least one fluidic coupling element (24) has at least two connecting webs (42, 42'), which extend at least substantially along a longitudinal axis (50) of the covering unit (16), and at least one stabilizing web (74), which connects the at least two connecting webs (42, 42').

6. The wiper device according to claim 1, wherein the wiper arm adapter (14) has at least one pin element (18) and at least one electrical male coupling element (56), which is latched on the at least one pin element (18) such that the male coupling unit (56) can be pivoted about the pin element (18).

7. The wiper device according to claim 1, wherein the at least one fluidic coupling element (24) comprises at least one valve element.

8. The wiper device according to claim 1, wherein the at least one covering unit (16) has a cap element (44) for covering the wiper blade adapter (12), which cap element forms a wind deflector geometry for making use of a relative wind to press the wiper device (10) against a windshield.

9. A windshield wiper comprising a wiper blade, and a wiper device with at least one wiper blade adapter (12) which is connected to the wiper blade and which has at least one fluidic connecting element (22), with at least one wiper arm adapter (14), with at least one covering unit (16), which is connected to the wiper arm adapter (14) such that the covering unit can be pivoted about a pivot axis (46) with respect to the wiper arm adapter (14), with at least one fluidic coupling element (24) for fluidic connection to the at least one fluidic connecting element (22), and with a mounting unit (25) for movably mounting the fluidic coupling element (24) on the at least one covering unit (16), wherein the mounting unit (25) has at least one mounting recess (54, 54') and at least one mounting extension (52, 52'), which is guided in the at least one mounting recess (54, 54'), wherein the at least one mounting recess (54, 54') is arranged on the fluidic coupling element (24).

10. The windshield wiper according to claim 9, wherein the at least one mounting extension (52, 52') is formed in one piece with the covering unit (16).

11. The windshield wiper according to claim 9, wherein the at least one fluidic coupling element (24) has at least one fluidic plug element (40), wherein the at least one mounting recess (54, 54') is arranged along a longitudinal axis (50) of the covering unit (16) in an offset manner in relation to the plug element (40).

12. The windshield wiper according to claim 9, wherein the at least one fluidic coupling element (24) has at least one fluidic plug element (40) and comprises at least one connecting web (42, 42'), which extends at least substantially along a longitudinal axis (50) of the covering unit (16) and delimits the at least one mounting recess (54, 54').

13. The windshield wiper according to claim 9, wherein the at least one fluidic coupling element (24) has at least two connecting webs (42, 42'), which extend at least substantially along a longitudinal axis (50) of the covering unit (16), and at least one stabilizing web (74), which connects the at least two connecting webs (42, 42').

14. The windshield wiper according to claim 9, wherein the wiper arm adapter (14) has at least one pin element (18) and at least one electrical male coupling element (56), which is latched on the at least one pin element (18) such that the male coupling unit (56) can be pivoted about the pin element (18).

15. The windshield wiper according to claim 9, wherein the at least one fluidic coupling element (24) comprises at least one valve element.

16. The windshield wiper according to claim 9, wherein the at least one covering unit (16) has a cap element (44) for covering the wiper blade adapter (12), which cap element forms a wind deflector geometry for making use of a relative wind to press the wiper blade against a windshield.

\* \* \* \* \*